United States Patent
Byles

[11] Patent Number: 6,161,776
[45] Date of Patent: Dec. 19, 2000

[54] MULTI-LAYERED, POROUS MAT TURF IRRIGATION APPARATUS AND METHOD

[75] Inventor: Joe D. Byles, Fresno, Calif.

[73] Assignee: Nibco Inc., Elkhart, Ind.

[21] Appl. No.: 09/132,735

[22] Filed: Aug. 12, 1998

Related U.S. Application Data

[60] Provisional application No. 60/055,336, Aug. 12, 1997.

[51] Int. Cl.[7] .................................................. A01G 27/00
[52] U.S. Cl. .............................. 239/145; 239/200; 405/36
[58] Field of Search .................................. 239/145, 200, 239/207, 542; 405/36, 118, 119; 47/1.01

[56] References Cited

U.S. PATENT DOCUMENTS

| | | | |
|---|---|---|---|
| 4,023,506 | 5/1977 | Robey | 111/1 |
| 4,065,926 | 1/1978 | Brandt | 61/13 |
| 5,306,317 | 4/1994 | Yisguzaki | 47/1.01 |
| 5,344,470 | 9/1994 | Molnar et al. | 47/58 |
| 5,938,372 | 8/1999 | Lichfield | 405/38 |

*Primary Examiner*—Henry J. Recla
*Assistant Examiner*—Timothy L. Maust
*Attorney, Agent, or Firm*—Price, Heneveld, Cooper, Dewitt & Litton

[57] ABSTRACT

A turf irrigation distribution and reservoir product and method ecosystem employing a substantially continuous mat on the soil surface on which turf is placed or produced, the mat having a primary, lateral water distribution structure which distributes water from a water charging inlet throughout the lateral area to the mat periphery where it is restrained, the water then being distributed vertically above and below the lateral distribution structure.

42 Claims, 8 Drawing Sheets

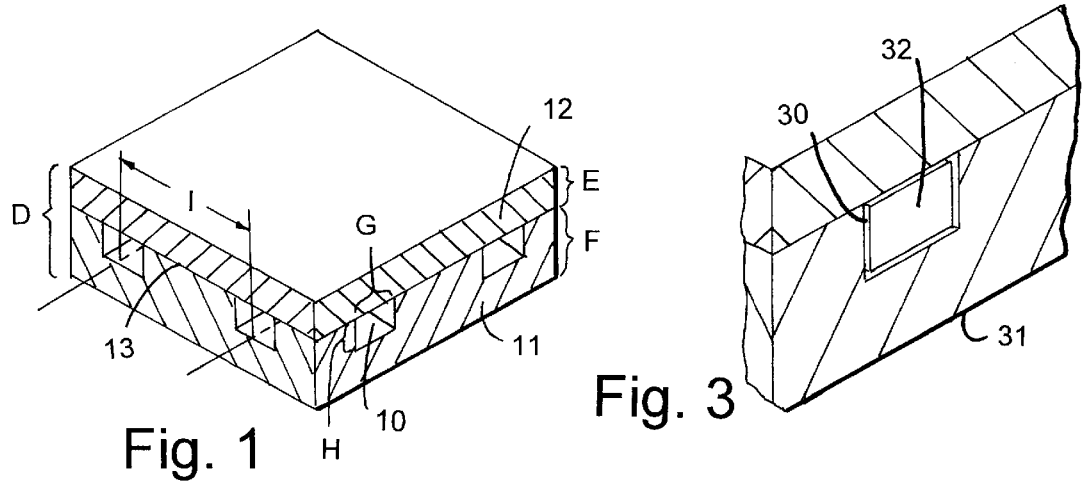
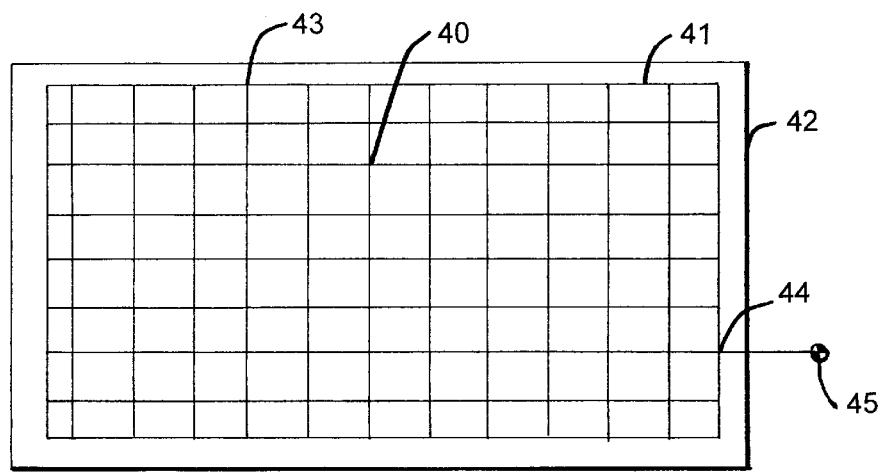
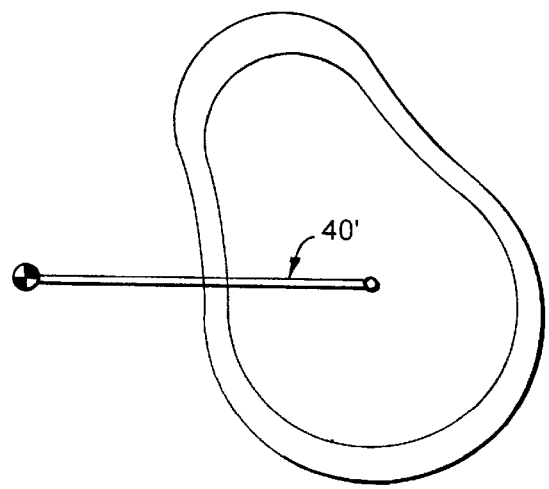

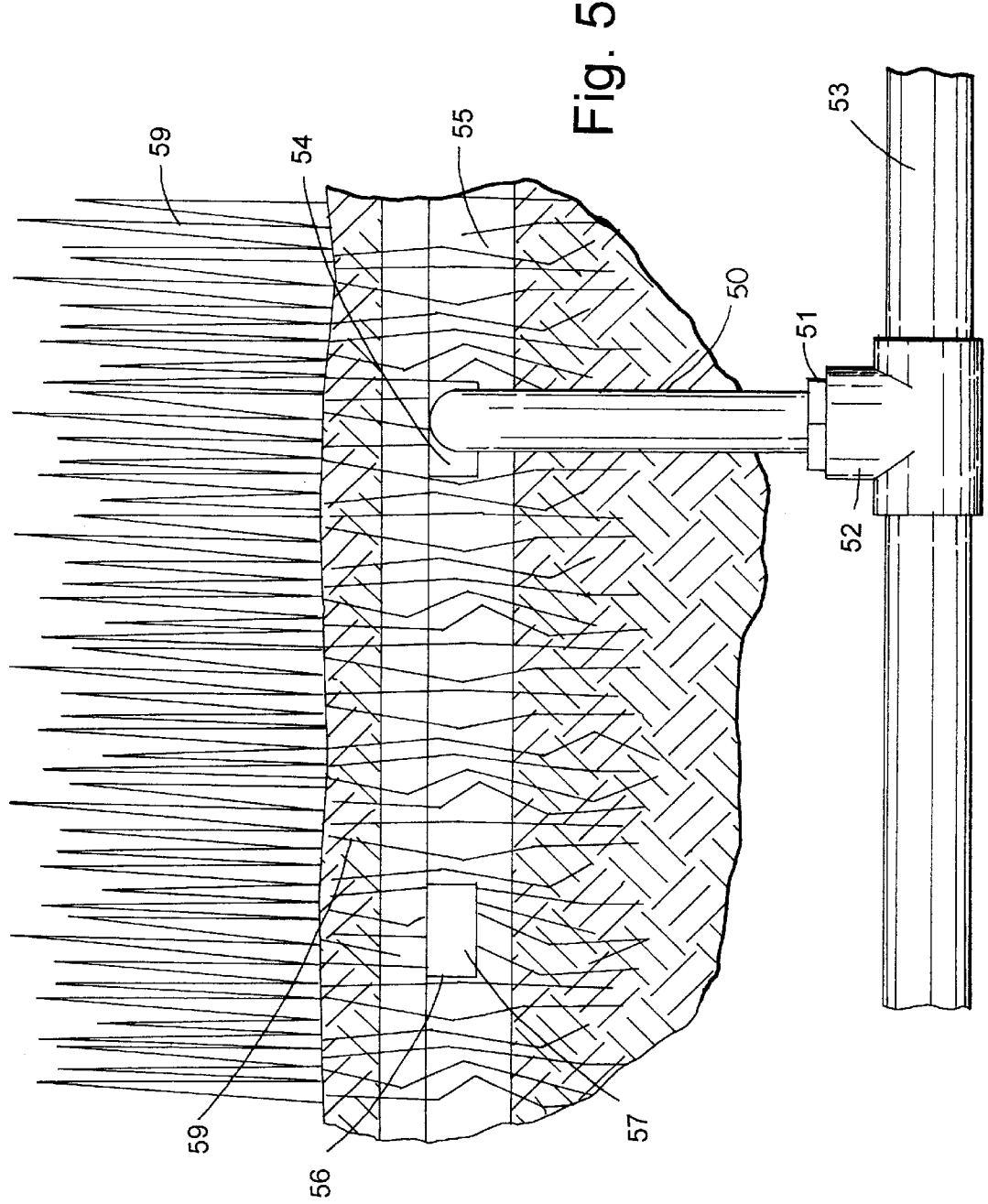

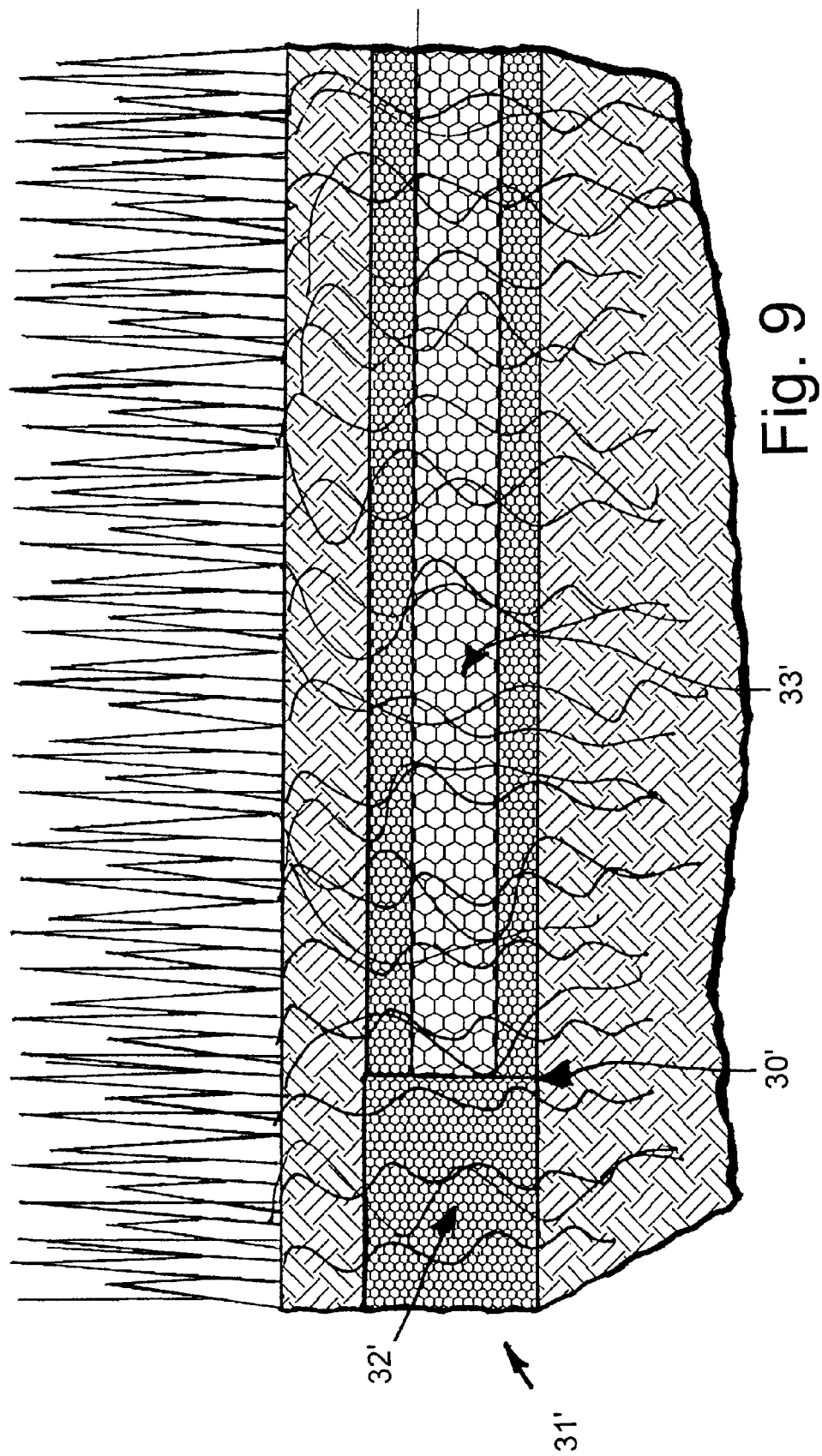

MULTI-LAYERED, POROUS MAT TURF IRRIGATION APPARATUS AND METHOD

CROSS REFERENCE TO RELATED APPLICATION

This application claims the benefit of prior provisional application Ser. No. 60/055,336, filed Aug. 12, 1997, entitled CHANNELED POROUS MAT TURF IRRIGATION APPARATUS AND METHOD.

BACKGROUND OF THE INVENTION

This invention relates to irrigation, and more particularly to an apparatus and method for providing efficient, cost effective, easy to install turf grass irrigation.

Abroad and in the United States a large percentage of potable, fresh water consumption is utilized for the irrigation of landscape turf and other ornamental plantings. The state of the art irrigation systems utilized for delivering this water to turf and landscape plantings are inefficient and contribute greatly to the exhaustion of water reserves in many areas. Sprinkler irrigation systems, which are most commonly used for landscape purposes, lose water to wind drift, evaporation, runoff, and overspray. The tiny spray droplets necessary to achieve uniform water distribution are vulnerable to wind and are more often than not blown out of the area intended to be irrigated, contributing to the overspray problems. Runoff occurs because the spray heads tend to deliver a large amount of water to a large area too quickly for the water to be effectively absorbed into the ground. The ideal application of a sprinkler system is to evenly distribute the water, through the air, to a given area at a rate equivalent or less than the hydraulic loading rate, or water infiltration rate, of the surrounding soil, so that the evenly distributed air born water droplets fall to the ground and are uniformly absorbed into the soil. In addition water droplets from the sprinkler systems tend to impinge on surrounding structures, such as houses, fences, vehicles, etc., causing discoloration, staining and destruction. Despite these limitations, sprinkler irrigation systems easily make up the majority of landscape irrigation systems installed today because of ease of installation and familiarity among irrigation contractors.

Low volume surface drip irrigation devices and lines, typically emitting water in the range of 0.5 to 2 gallons per hour, use an extensive network of conduits with emitters attached to them which are spaced apart on the surface of the area to be irrigated. The water emits from these devices at slow rates and is mainly influenced by capillary action and gravity once it enters the soil area directly around the emission point. Delivery of water in this manner does eliminate overspray and runoff, but is only practical for landscape plantings in areas not subject to traffic or heavy maintenance, and even in those applications, is not practical for dense landscaping with shallow root zones such as ornamental ground covers or turf. If such an irrigation technique were used in traffic areas such as lawns, the lines would have to be laid down 12–18 inches apart and taken up between irrigations to allow for usage of the lawn and regular maintenance. This impracticality, combined with the detracting visual appearance of the lines placed every 12–18 inches along the surface of the lawn make this usage totally unacceptable.

Subsurface drip irrigation systems consist of low volume drip emitter lines, with drip emission rates ranging from 0.5 to 2 gallons per hour, placed beneath the soil surface in order to provide watering of the plants at the roots. The lines consist of extruded polyethylene lines with calibrated emission drip devices either inserted onto or into the line. The water is emitted at the drip rate substantially along the line at points below the soil surface and distributed by the effects of capillary action of the soil and gravity. The lines are typically buried 6–8 inches below the soil surface and are spaced 12 to 18 inches apart in order to attempt to provide uniform watering to the top soil layers in-between and above the drip lines. The 12 to 18 inch spacing requirement for these buried drip lines translates into substantial installation labor costs (approximately 3 to 4 times the cost of conventional sprinkler installations). Even with the close spacing, the effects of gravity combined with the capillarity of the soil below the drip lines causes more than 50 percent of the water to be dropped below the drip line level and lost to the lawn and shallow rooted plantings due to percolation. In addition to inefficiencies, these buried lines and emission devices are plagued with problems of plant roots growing into them and plugging the emitters. State of the art solutions to this problem have consisted of using toxic chemicals impregnated within the lines or emission devices or injected into the treatment water to kill the roots around the emission device. Even if roots are kept out through chemical treatments, soil working into the emission devices is a problem because of the low velocity and mass flow rate of the water exiting the emission device (the water typically drips out).

The low flow rate emission points can also easily be plugged by insects, insect eggs and various other natural blocking agents. Finally, the large number of lines with subsurface drip irrigation make it more susceptible to mechanical damage from digging activity, planting and typical intrusive lawn use activities (i.e. installing sewers, posts, electrical lines, cable lines, etc.).

Other forms of irrigation include excavated impermeable layers located somewhere within the root zone to create moisture reservoirs for the roots to grow into. These forms of irrigation, however, require great amounts of site preparation, excavation, and back filling in order to achieve the desired results.

Another form of irrigation developed by the inventor herein is a form of irrigation in which discrete, controlled amounts of water are distributed above the thatch layer of the soil at such a rate as to create distribution caused by exceeding of the local hydraulic loading gradient and wicking action of the thatch. This form of turf irrigation is found to be more efficient than the other forms listed but still is subject to variables such as amount of thatch and turf surface irregularities.

All of the systems previously described, except for the surface drip irrigation, require extensive digging and excavation of the soil into which the irrigation system is to be installed, m driving up costs of the system dramatically. In fact, for a typical sprinkler installation, the hardware is typically only about 25% of the cost of the final installed system, the majority of costs being attributed to labor required to move earth during the installation.

To the knowledge of the inventor, no prior system for irrigating turf provides both efficient irrigation and low cost installation.

SUMMARY OF THE INVENTION

It is therefore a general object of the invention to overcome the above described limitations and other problems associated with irrigation devices and methods, particularly devices and methods for low volume subsurface drip irrigation and spray irrigation of turf and dense ground cover plantings.

The irrigation mat apparatus or product according to the invention comprises a substantially continuous, porous and permeable mat which is laid beneath the sod, soil and seed, or hydromulch in an area in which turf grass is to be established. The mat has a water charge inlet and a primary water distribution structure which comprises a layer of porous and laterally permeable water distribution material. This primary water distribution material receives the irrigation water through the charge inlet and, when the irrigation water is received at an operating flow rate, distributes the irrigation water substantially throughout the lateral area of the mat. The water charge inlet may be through the top or bottom of the mat, or laterally into the primary distribution material. The primary water distribution structure may contain laterally oriented flow channels in its interior to conduct aqueous fluid and/or air. The mat may be formed of two layers which define channels therebetween. The porous mat is preferably produced of three layers having a layer of high water intake (large open pore size of flow channel) material sandwiched between two layers of smaller size, open pore flexible material. The mat may be formed from these three layers of polymeric foam material, as of polyurethane, the bottom layer preferably being approximately ¼ inch thick and of smaller pore size so as to absorb and hold water or aqueous solution, the middle layer preferably being about ½ inch thick and of larger pore size so as to provide storage area and allow transmission of water or a solution from a source throughout the mat, and the top layer preferably being about ¼ inch thick and of smaller pore size so as to absorb and hold water or a solution. The top layer is adhered to the middle layer, and the bottom layer is adhered to the middle layer, creating a single piece made up of three joined layers. The composite foam material creates an open cell structure which allows air, water, nutrients and turf roots to pass freely through the mat. The middle layer or primary water distribution structure may be formed of reticulated fiber material or a porous granular material between two layers as of foam. Or the upper and lower layers may be of reticulated form, i.e., interconnected, variably oriented fibers, although it is preferred to have the upper and lower layers of foam polymer. The upper and lower layers may alternatively be a perforated sheet material. In any event, the upper and lower layers have water charging characteristics different from that of the primary water distribution material.

The mat may also be provided with strips, as of foam, which can be utilized to create resistive edge boundaries to the flow of water through the middle layer of the mat. The foam strips can be inserted around any boundary, effectively restricting flow as by eliminating the middle high porosity section of the mat in that boundary area, and thereby impeding the flow of fluid out of that portion of the mat. In addition, during the manufacture of the porous mat, it is possible to insert a tough, flexible metal or cloth, e.g., nylon, sheet within the three mat layers so as to create a layer of impermeable material to keep burrowing animals such as rodents, gophers, etc. out of the installed product. Areas in which two or more mats are installed side by side can have a seam created by an adhesive foam strip or any commonly available porous tape product. However, as long as the high porosity middle layers of the mats butt up to each other, the primary water distribution structure will be continuous and fluid will distribute throughout the entire selected area covered by the mats.

The method in which the above porous irrigation mat apparatus is utilized is as follows:

1) The area for the turf grass installation is determined;
2) The porous mat is laid out on top of the soil or base surface and preferably staked into place utilizing plastic or metal stakes;
3) The mat is trimmed to the shape of the final turf plot (minus about 6 inches around the final turf boundary);
4) Any joints of pads where they join may be taped (if necessary) to form a continuous pad;
5) Large pore middle layers, and particularly channels, open and exposed at boundaries are closed off with solid strips of material approximately the same thickness as the composite mat, or other suitable flow blocking material;
6) The water source (from a hose bib, irrigation valve and pipe, etc.) is fed into the high porosity middle section of the composite mat through a charge inlet at a point in the mat, using a flexible hose, e.g., garden hose, or pipe, e.g., polyethylene or flexible PVC pipe, connected to an underground piping network; and
7) If using sod: Lay sod on mat surface just the same as laying on bare soil.

If using seed: Spread a 1 inch layer of top soil over the mat, then seed as normal.

If using hydromulch: Spread a 1 inch layer of top soil over mat, then hydroseed as usual.

The mats can be made in segments such as 4 by 4 foot mats which can be palletized and transported. At the installation site, they are placed edge-to-edge, optionally taped together, until the desired area is covered. The outermost peripheral edge of the assembled mat is closed off.

Once the system is installed, the water source connection to the charge inlet can be pressurized, sending water flowing into the middle section or primary water distribution structure of the combined porous mat.

BRIEF DESCRIPTION OF THE DRAWINGS

FIG. 1 is a cross sectional view showing the novel mat in two layer form with channels in the bottom layer;

FIG. 3 is a cross sectional view showing the end of a channel in FIG. 1 at a boundary with a plugging device installed to stop water from directly flowing out of the channel;

FIG. 4 is a schematic plan view using the mat in FIG. 1 and showing a typical lawn installation;

FIG. 5 is a cross sectional view showing a water charging connection to the porous mat of FIG. 1;

FIG. 9 is a cross sectional view showing the boundary of the mat in FIG. 7 with a solid strip installed at a boundary to inhibit water from directly flowing out of the channel;

FIG. 10 is a schematic plan view showing a typical lawn installation using the second embodiment;

DESCRIPTION OF THE PREFERRED EMBODIMENTS

FIRST EMBODIMENT

Figure 2:
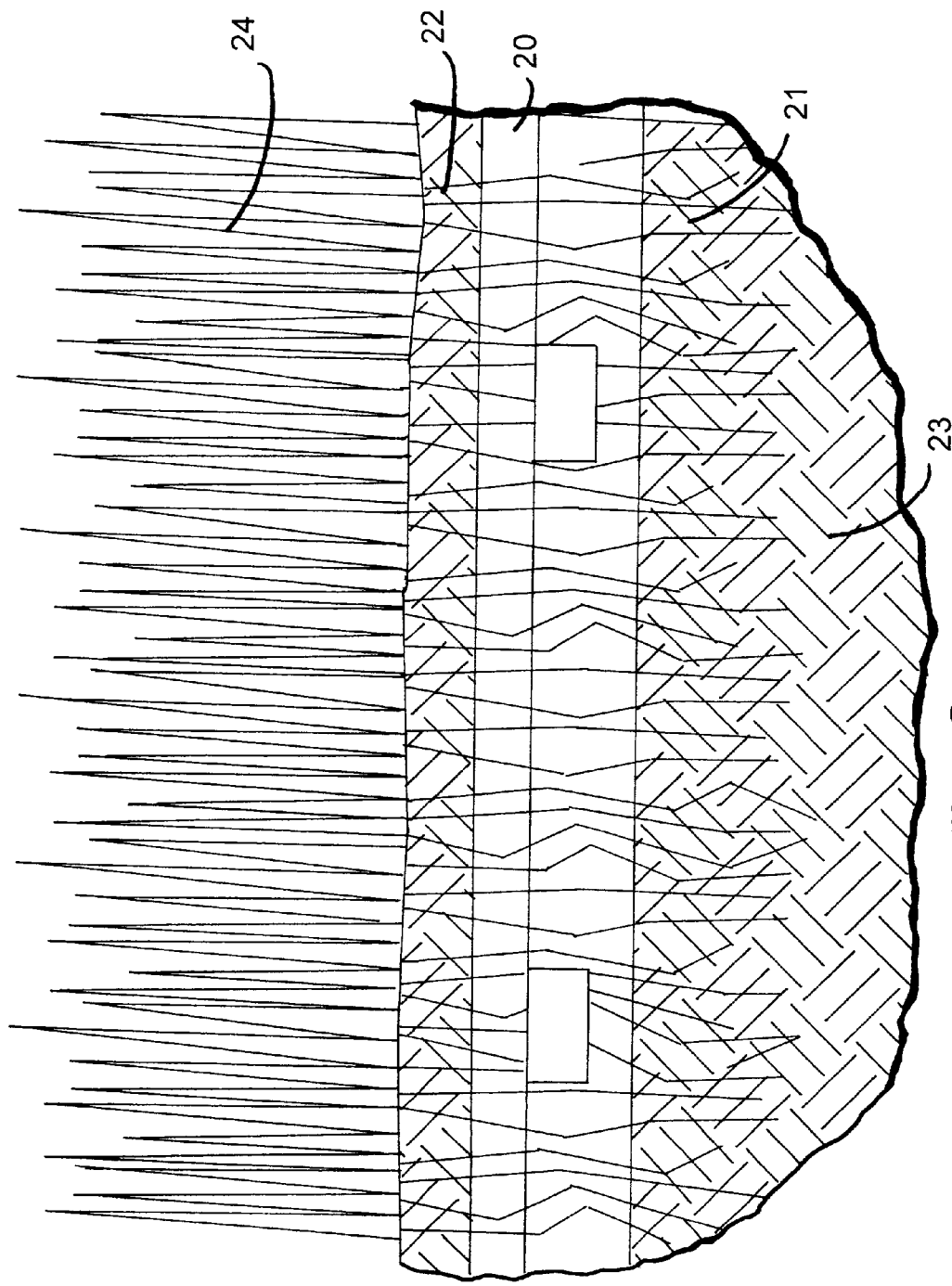
FIG. 2 is a cross sectional view showing the porous mat in FIG. 1 installed, with roots growing through the mat and surrounding soil.

FIG. 1 shows a dimensional cross sectional view of a polymeric foam mat with channels 10 formed into the bottom layer 11 and the top layer 12 attached thereto. The channels 10 and separating foam material in bottom layer 11 comprise the primary water distribution structure in this form of the invention. Between the bottom layer 11 and top layer 12 is the location 13 of an optional flexible wire mesh to prevent rodent intrusion. The overall thickness dimension D of the assembled mat is preferably between about 1 and 1.5 inches. The thickness E of the top layer 12 is preferably between about 0.25 and 0.5 inch. The thickness F of the bottom layer 11 is preferably between about 0.5 and 1 inch. The channel 10 is preferably typically about 1 inch wide G and about 0.5 inch deep H. The channels preferably are about 10 inches apart I. Although these dimensions in the experimental testing were highly successful, they could vary depending on the installation. For example, the channels 10 may have any cross-sectional size over approximately 0.25 inch square inch, or 0.0625 square inch. Pore size in the bottom layer 11 and top layer may preferably be in the range of 30 to 100 pores per square inch.

FIG. 2 is a cross sectional drawing showing the porous mat assembly 20 installed with roots 21 growing throughout the mat 20 and surrounding soil at 22 above the mat 20 and at 23 in the soil below the mat. The turf 24 is shown growing above the top soil layer 22. The roots 21 are shown to have anchored the soil 22 to the mat assembly 20, providing a high integrity installation. These characteristics are evidenced in the experimental results.

FIG. 3 is a cross sectional drawing showing the end of a channel 30 at a boundary 31, with a plugging device 32 installed to stop water from directly flowing out of the channel 30. The plugging device 32 may be a foam plug, or any alternative closure, shaped to fit snugly into the channel 30 formed between the upper and lower layers in the mat assembly.

FIG. 4 is a schematic plan showing a typical lawn installation. The intersecting grid pattern 40 represents the intersecting channels within the mat assembly laid onto the ground in the shape 41. The overall irrigated area is defined by boundary 42. Each end point 43 of a channel would be plugged as by a plugging device 32 as shown in FIG. 3. The charging point of connection 44 is a flexible tube inserted into a channel of the mat. The tube is shown connected to a control valve 45 to activate the flow of water into the channel matrix of the mat.

FIG. 5 is a cross section showing a typical water connection to the porous mat. A flexible hose 50 is connected through a barbed connection 51 which is attached to a typical PVC fitting 52. A rigid supply line 53 runs from a supply valve (not shown). The flexible hose 50 is run into a charge inlet comprising an end channel opening 54 of the mat assembly 55. Other channel openings 56 are closed off with an end plug 57. The turf grass 58 is shown with roots 59 growing through the mat assembly 55 as has been observed. The charge inlet is preferably located near the highest elevation point of the mat 55. Also, the charge inlet may be at a channel in a central area of the mat rather than a peripheral edge.

Figure 6:
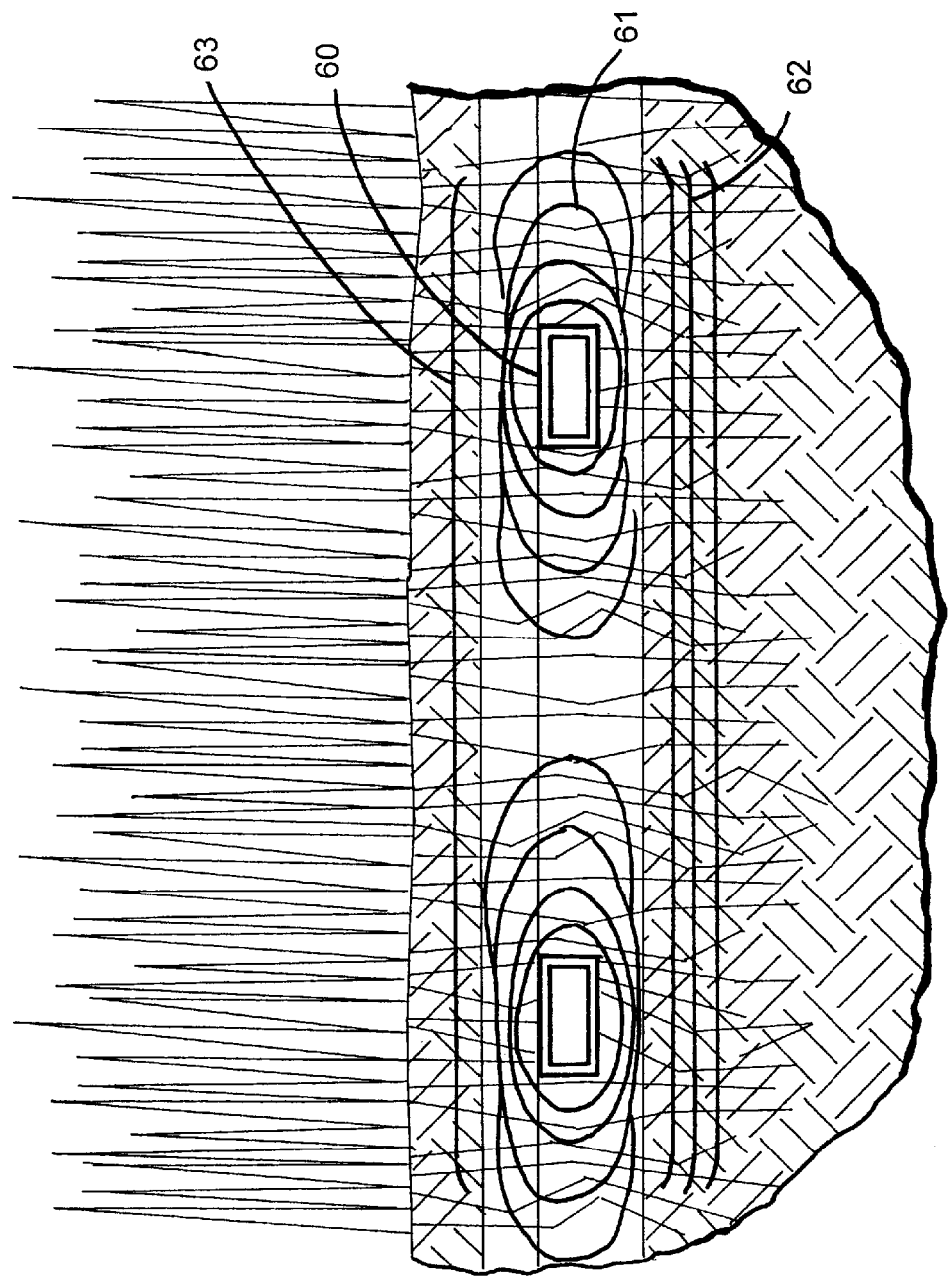
FIG. 6 is a cross sectional view showing the wetting pattern associated with the water distribution of the porous mat in FIG. 1.

FIG. 6 is a cross section showing the wetting pattern associated with the water distribution of the porous mat. When water is first applied into a channel 60 in the primary water distribution structure of the mat, the water first flows throughout the interconnected channels. Thus, the network of interconnected channels 60 serve to distribute the water throughout the lateral area of the mat. The water then flows from each channel 60 horizontally outwardly through the adjacent porous and permeable material 61. Finally, the irrigation water moves in an upward and downward direction in uniform wetting fronts 62 and 63. To achieve this desired water distribution, water may be supplied to the primary water distribution structure at an operating flow rate from about 5 gallons per hour flowing continuously per 1000 sq. ft. of turf to about 15 gallons per minute flowing 10 minutes per day per 1000 sq. ft. of turf applied at the maximum evaporative transpiration rate.

SECOND EMBODIMENT

Figure 7:
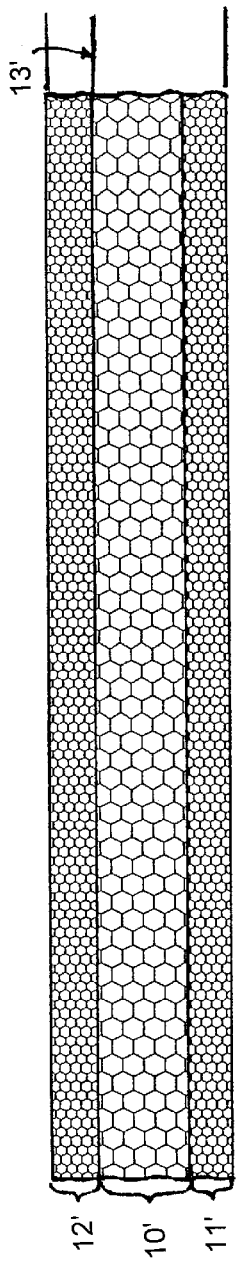
FIG. 7 is a cross section showing a composite polymeric open cell foam mat with different layers of porosity according to a second embodiment;.

FIG. 7 shows a dimensional cross sectional view of the composite polymeric, preferably polyurethane, foam mat with large pore middle layer 10', the small pore bottom layer 11' and the small pore top layer 12' all bonded together by any suitable means. Middle layer 10 makes up the primary water distribution structure in this embodiment of the invention. Between the middle large pore layer 11' and the small pore top layer 12' is the location 13' of the optional flexible wire mesh to prevent rodent intrusion. The overall thickness dimension D of the assembled mat is preferably between about 1 and 1.5 inches, with the bottom, small pore layer thickness preferably being approximately one-fourth of the overall dimension, the large pore middle layer preferably being one-half of the overall dimension, and the top, small pore layer preferably being about one-fourth of the overall dimension. The layers of the composite pad are bonded together such that the product can be cut without the layers separating from each other. Also, the bonding arrangement retains the permeability between the layers 10', 11' and 12'.

Figure 8:
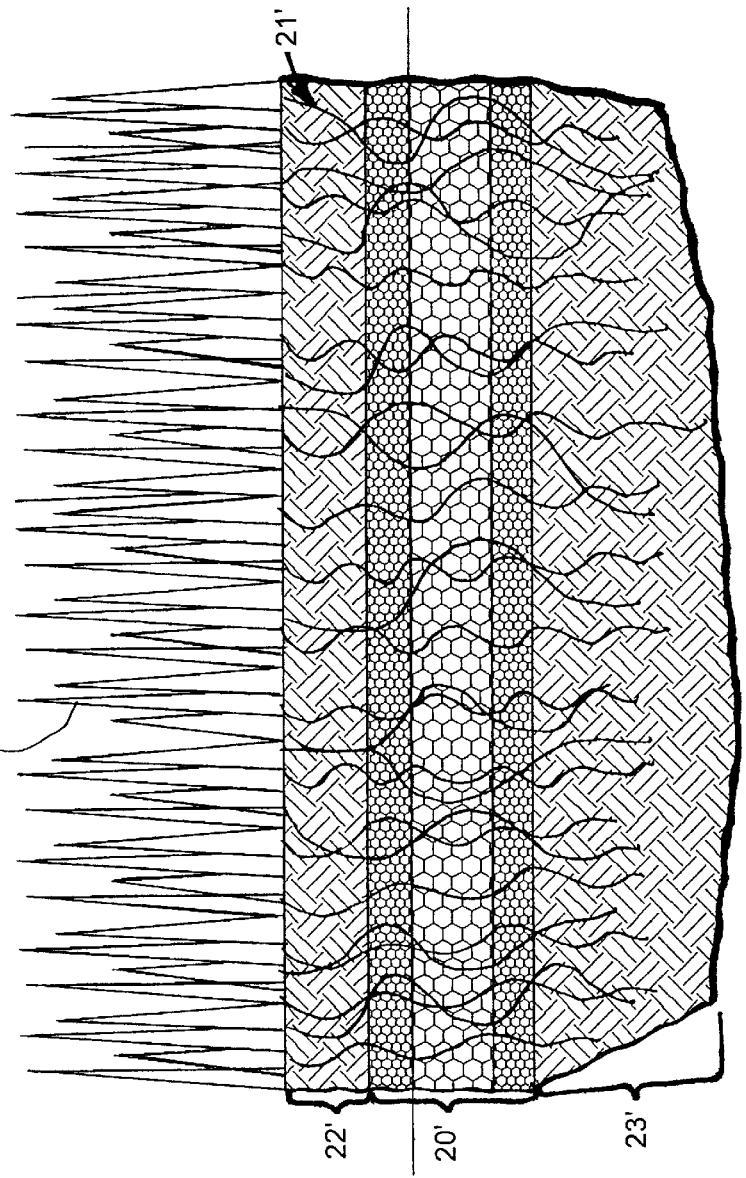
FIG. 8 is a cross sectional view of the mat in FIG. 7 showing the porous mat installed with roots growing throughout the mat and surrounding soil.

FIG. 8 is a cross sectional drawing showing the porous mat assembly 20' installed with roots 21' growing throughout the mat 20 and surrounding soil 22' above the mat 20' and soil 23' below the mat. The turf 24' is shown growing above the top soil layer 22'. The roots 21' have anchored the soil 22' to the mat assembly 20', providing a high integrity installation.

FIG. 9 is a cross section drawing showing the end of the mat 30' at a boundary 31' with a fluid distribution stopping strip or peripheral boundary material 32' installed to stop water from directly flowing out of the middle large pore layer of the composite mat 33'. The plugging strip 32' may be a small pore foam strip which butts up along the outer segment of the composite mat, a strip of adhesive tape, or the like. The composite mat can also be flow restricted at boundaries by folding the mat edge over and securing it into the base soil, or adding any fluid impermeable surrounding material ( or material of different hydraulic loading gradient) to the outer edge.

FIG. 10 is a schematic plan view showing a typical lawn installation. The mat is installed underneath the turf areas and may be trimmed to the required shape so that approximately a 6 inch boundary is provided for the turf to grow into. The boundaries are sealed with a material as described in the previous paragraph and as shown in FIG. 9. The charging point of connection 40' is a flexible tube inserted into the middle layer of the composite mat. The tube is shown connected to a control valve 42' to activate the flow of water into the middle layer of the mat. The system can also be designed such that the water is introduced at a low rate to run continuously, eliminating the need for valves or controllers. In fact, experimental operations have clearly demonstrated that a flow rate only a small fraction of that necessary for previous irrigation technology is sufficient to maintain luxuriant turf.

Figure 11:
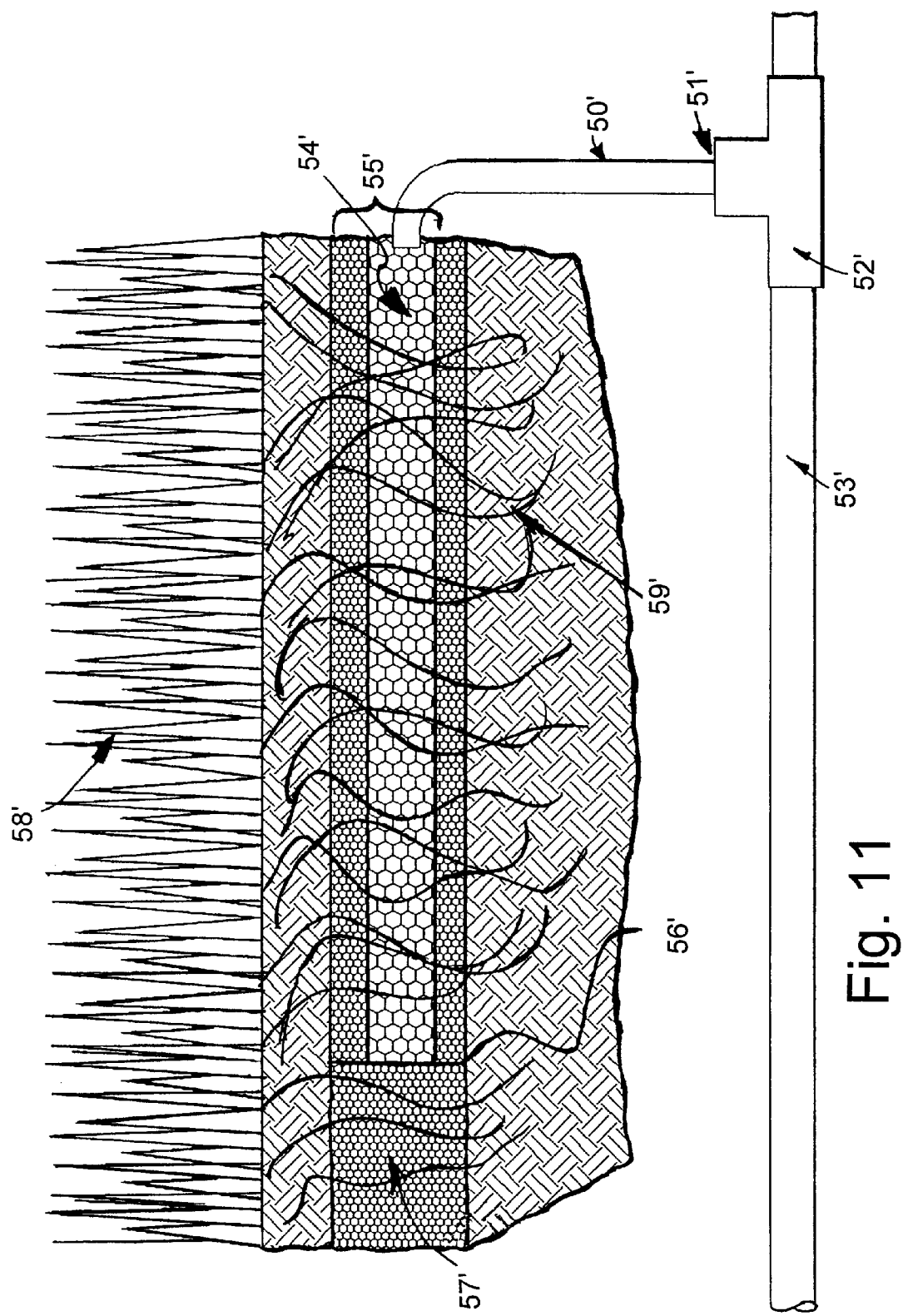
FIG. 11 is a cross sectional view showing a typical water connection to the porous mat of FIG. 7.

FIG. 11 is a cross section showing a water charge connection to the porous mat. A flexible hose 50' is connected through a barbed connection 51' which is attached to a typical PVC fitting 52'. A rigid supply line 53' runs from a supply valve (not shown). The flexible hose 50' is run into the charge inlet to middle section 54' of the composite mat assembly 55'. Other boundaries of the mat 56' are shown closed off with solid small pore strips 57'. The turf grass 58' is shown with roots 59' growing through the mat assembly 55', as has been observed. The charge inlet may be near a peripheral edge of the mat 55' or in a central location. In any event, the charge inlet is preferably at the highest elevation point of the mat 55'.

Figure 12:
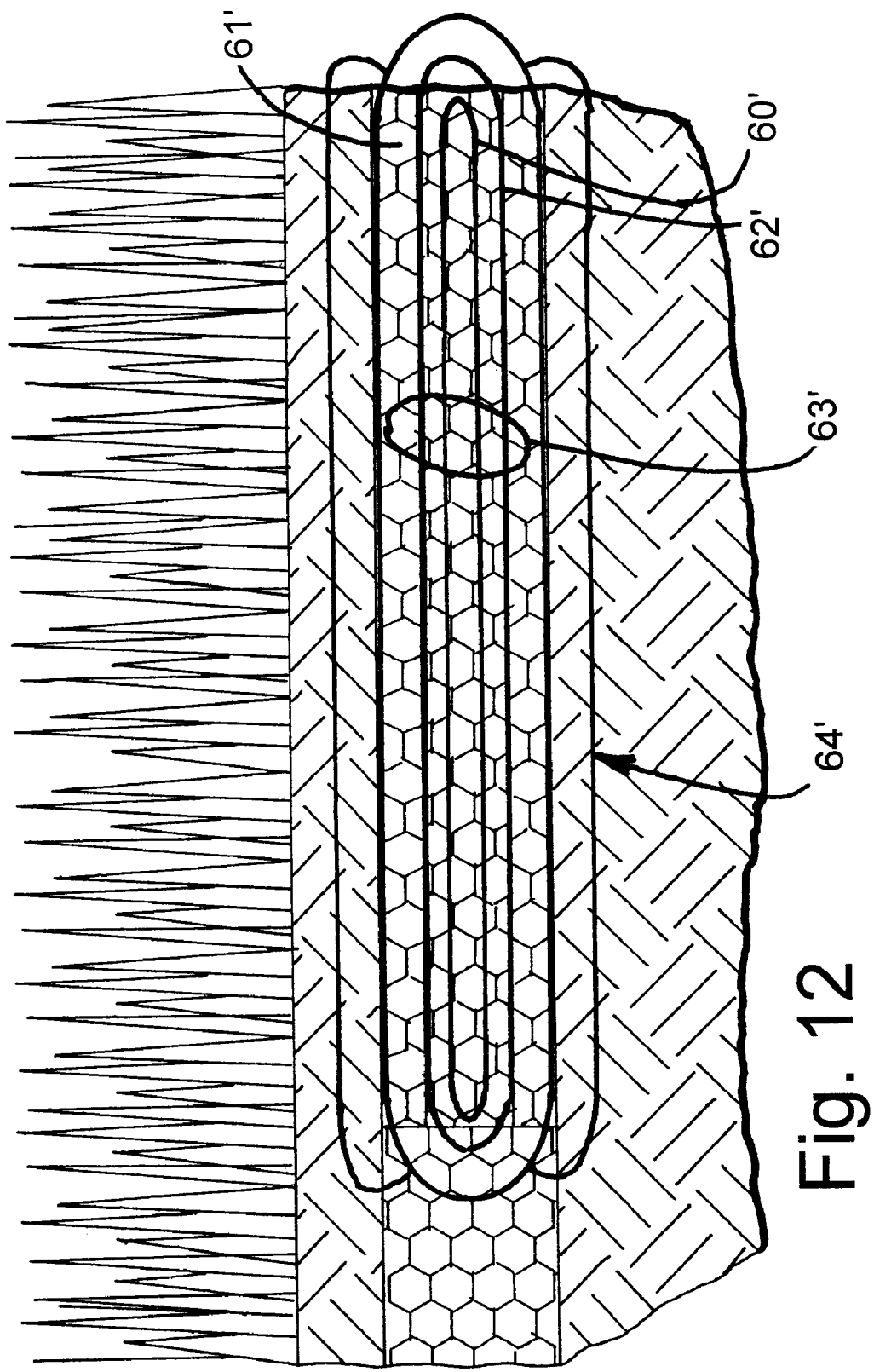
FIG. 12 is a cross sectional view showing the wetting pattern associated with the water distribution of the porous mat of FIG. 7.

FIG. 12 is a cross section showing the wetting pattern associated with the water distribution of the porous mat. Water has first filled the large pore middle layer 60' and then saturates the upper and lower small pore mat layers 61' and 62' respectively. The water uniformly moves out of the mat assembly 63' in horizontal wetting fronts. The water also uniformly moves in an upward direction in uniform wetting fronts 64'.

The theory behind the invention is that of differential hydraulic loading gradients. Water takes the path of least resistance. The application of the theory to the porous, layered mat of the second embodiment involves the differential water intake rates of the open cell small pore foam, the open cell large pore foam, and the soil beneath the mat and above the mat. At the instant water is first introduced into the middle layer 10', the path of least resistance for the water (and correspondingly the area of highest water intake rate) are the voids or channels created within the large pore size foam middle of the composite pad. The water freely moves into this chamber and is distributed throughout the area to be irrigated directly beneath the turf. The second most path of least resistance for the water once the open middle high porosity chamber is filled (and correspondingly the area of the second highest water intake rate) is the smaller pore size, outer foam layers of the composite strip. The water will completely saturate the outer layers of the porous foam mat because of the higher water intake rate and the fact that the foam mat is of a different texture and porosity that the soil above and below the layers of the composite mat. Once the mat is completely saturated, then the water will flow to the ½ to 1 inch layer of soil above the mat and to the soil below the mat. The net effect of the method and process is to evenly distribute the irrigation water or fluid directly into the root zone of the turf, and to produce a reservoir for subsequent controlled irrigation.

Once the turf grass is established, the roots of the turf will grow through the upper layer of soil, into and through the layers of the porous mat, and into the base soil on which the composite porous mat was placed. This growing of the root mass serves two purposes, firstly to allow the turf to take up water within the root zone, and secondly to anchor the root zone and the porous mat within the root zone. Because the roots grow uniformly through the mat material there is no net change in the relative hydraulic loading gradients of the composite layers of the material, such that even when the roots extend throughout the mat, the water or fluid still takes a preferential path through the middle, large pore layer, and then out to the outer small pore layers and then finally into the soil above and below the material. The roots that grow through the composite foam mat are free to take up water or fluid contained within the mat, water contained above the mat, or water contained below the mat. Every time the system is charged with water, it is moved directly into the mat, which is part of the active root zone, and above and below the mat as well. Optionally, fertilizer and/or other reagents may be charged to the turf roots with the water serving as an aqueous carrier. The mat also serves to enable air to flow to the roots. Roots require aeration for optimum health. The mat thus provides an effective ecosystem for the turf, as has been experimentally demonstrated. The system can also drain off excess water from heavy rains.

The mat is constructed such that a person can dig into the turf area without causing damage to the rest of the system. If an area is dug into, a repair of flow to that area can easily be established by merely laying a foam section in the excavated area and ensuring hydraulic conductivity to one or more channels in the adjacent system. Also, punctures into the system typical of aeration of soil or dethatching will not harm the system as it is a semi-pressurized system. The water will still flow to all areas.

If preferential flow is required, or reduced water movement through the mat is needed, such as on a hill or mound, strips or segments of small pore foam material can be cut into or inserted into sections of the mat area (regionally eliminating the large pore high flow middle composite section or flow channels) and retarding the flow through the mat down the hill, mound or slope. This prevents water from freely moving off of hills, slopes or mounds and collecting at lower points of the landscape.

In other forms of the invention, various porous materials can be used to create a continuous mat with channels and a water charge inlet. For instance, two sheets of porous and permeable landscape fabric or shade cloth can be utilized with sufficiently porous blocks of material spaced between the two layers to form channels. In this form of the invention the channels are defined by the block side walls and landscape fabric and the soil above and below the landscape fabric. The mat would be used as described above, particularly with respect to the first embodiment. Also, a uniform, large pore material may be sandwiched between two sheets of porous and permeable landscape fabric to produce a mat similar to the second embodiment described above.

The irrigation mat product can also be utilized as source of irrigation water for planter bed areas also, instead of turf. The product is used as above, except that it is buried deeper within the soil. The landscape plantings within the bed are planted on top of or through the mat by digging a hole into the soil and cutting through the mat. The plant is placed in the hole and water will flow from the mat into the area surrounding the individual plant.

Testing conducted on this form of irrigation by the inventor has shown the ability to keep the turf alive and healthy at greater efficiency than observed with sprinklers, subsurface drip, surface drip irrigation or surface low energy precision flooding irrigation. A cool season tall fescue variety of grass was maintained throughout the hot growing season in Fresno, California with approximately 75% of the required evapotranspiration of the turf. One significant reason for the enhanced efficiency is the total saturation and distribution of the water prior to dropping to the soil profile below the mat.

A summary of many benefits to this form of turf grass irrigation follows:

1) No digging in the turf area is required, the mat is merely laid upon the soil surface and the sod, seed or hydromulch is placed upon it.

2) No overspray of water.

3) Water is evenly distributed throughout the entire root zone prior to dropping below the mat.

4) No hydraulic design needs to be completed prior to installation of the system. Simply lay the mat over all intended turf areas and cover with sod.

5) No minimum water flow or pressure needed. The only requirement is that during a run time (i.e. 24 hours) enough water is put out to satisfy the water requirement of the area of the planting irrigated.

6) High efficiency irrigation.

7) No wind effects.

8) No damage from equipment, digging or puncturing of the ground.

9) Highly cost effective, considering the savings in installation labor.

10) No system design needs to be laid out for heads, lines or units as used in spray systems.

11) Soft, shock absorbing turf surface for use and activity. Safer for sports and laying.

12) Eliminates compaction of the turf or planting areas.

13) Acts as a drainage mechanism to move excess water and allows air flow exchange throughout the root zone.

14) No sprinkler needed for supplemental irrigation. Just dig into middle large pore area and run water source. Will distribute evenly over a large area.

15) Mat provides deterrent to the growth of weeds contained in the subsoil. Weed seeds contained in the subsoil cannot penetrate to the upper surfaces. Reduces the need for chemical weeding.

16) Not affected by freezing.

17) Provides excess water movement in times of flooding.

18) Helps reduce instance of weed growth by blocking growth from base soil into sod.

19) Provides aeration of the soil and prevents compaction.

20) Provides rooting medium in absence of suitable soil.

21) Prevents surface disruption and rutting due to traffic and heavy equipment by acting as a reinforcement to the soil surface.

The above described preferred embodiments are intended to illustrate the principles of the invention, but not limit the scope of the invention. Various other embodiments and modifications to these embodiments may be made by those skilled in the art without departing from the scope of the invention as described.

What is claimed is:

1. A method of installing turf, the method comprising the steps of:

positioning a substantially continuous water-permeable mat defining a primary water distribution structure over a base surface in an area which is to contain turf; and positioning a turf sod over the substantially continuous mat, wherein the primary water distribution structure comprises a network of laterally extending, interconnecting channels, and a porous and laterally permeable primary water distribution material positioned between the channels and open to receive irrigation water from adjacent channels.

2. The method of claim 1 further comprising the step of:
a) positioning an upper boundary material over the primary water distribution material prior to positioning the turf sod, the upper boundary material comprising a porous and permeable material having water charging characteristics different from the water charging characteristics of the primary water distribution material.

3. The method of claim 2 further comprising the step of:
a) positioning a lower boundary material to reside between the base surface and the primary water distribution material, the lower boundary material comprising a porous and permeable material having water charging characteristics different from the water charging characteristics of the primary water distribution material.

4. The method of claim 3 wherein the steps of positioning the lower boundary material, the primary water distribution material, and the upper boundary material are performed simultaneously.

5. The method of claim 1 further comprising the step of:
a) positioning a water supply conduit to direct irrigation water into one of the channels.

6. The method of claim 1 further comprising the step of:
a) in each channel which intersects a peripheral edge of the primary water distribution material, blocking the respective channel substantially at the location at which the channel intersects the peripheral edge of the water distribution structure.

7. A method of installing turf, the method comprising the steps of:

positioning a substantially continuous water-permeable mat defining a primary water distribution structure over a base surface in an area which is to contain turf; and positioning a turf sod over the substantially continuous mat, wherein the primary water distribution structure comprises a substantially uniform porous and laterally permeable primary water distribution material, and further comprising the step of positioning a water flow blocking material around substantially the entire peripheral edge of the primary water distribution material.

8. The method of claim 7 further comprising the step of:
a) positioning a water supply conduit to direct irrigation water into the primary water distribution material at a charging point located at the peripheral edge of the primary water distribution material.

9. The method of claim 7 further comprising the step of:
a) positioning a water supply conduit to direct irrigation water into the primary water distribution material at a central location within the area to be covered by the primary water distribution material.

10. A method of producing a turf ecosystem, the method comprising the steps of:

positioning a substantially continuous water-permeable mat over a base surface in an area which is to contain turf, wherein the mat comprises a network of laterally extending, interconnecting channels, and a continuous porous and laterally permeable primary water distribution material positioned between the channels and open to receive irrigation water from adjacent channels;

positioning a layer of material comprising growing medium and live turf plant material over the mat; and providing a water inlet to said mat such that water will be distributed evenly in the area of the mat.

11. An irrigation method comprising the steps of:

supplying irrigation water at a charge rate into a primary water distribution structure associated with a continuous water-permeable mat having a lateral area residing in the root zone of an area to be irrigated and extending throughout the area, the mat forming a discontinuity with the material above the mat and the material below the mat; and distributing the irrigation water throughout the lateral area of the mat through the primary water distribution structure in response to the irrigation water supplied at the charge rate such that water is supplied evenly to the root zone, wherein the step of distributing the irrigation water through the lateral area of the mat includes the step of distributing irrigation water through a network of interconnected channels associated with the primary water distribution structure and wherein the primary water distribution structure includes a porous and laterally permeable primary water distribution material in areas between the interconnected channels and the step of distributing irrigation water throughout the lateral area of the mat includes distributing irrigation water from the channels through the primary water distribution material, and wherein the step of supplying irrigation water to the primary water distribution structure comprises directing irrigation water from a water supply conduit into one of the channels at a peripheral edge of the mat, and further comprising the step of in each channel which intersects a peripheral edge of the mat, blocking the respective channel substantially at the point at which the channel intersects the peripheral edge of the mat.

12. An irrigation method comprising the steps of:

supplying irrigation water at a charge rate into a primary water distribution structure associated with a continuous water-permeable mat having a lateral area residing in the root zone of an area to be irrigated and extending throughout the area, the mat forming a discontinuity with the material above the mat and the material below the mat; and distributing the irrigation water throughout the lateral area of the mat through the primary water distribution structure in response to the irrigation water supplied at the charge rate such that water is supplied evenly to the root zone, wherein the step of distributing the irrigation water through the lateral area of the mat includes the step of distributing irrigation water through a network of interconnected channels associated with the primary water distribution structure and wherein the primary water distribution structure includes a porous and laterally permeable primary water distribution material in areas between the interconnected channels and the step of distributing irrigation water throughout the lateral area of the mat includes distributing irrigation water from the channels through the primary water distribution material, wherein the channels are filled with a porous and permeable channel material having charge characteristics different from the primary water distribution material and the step of distributing the irrigation water through the channels comprises distributing the water through the channel material.

13. An irrigation method comprising the steps of:

supplying irrigation water at a charge rate into a primary water distribution structure associated with a continuous water-permeable mat having a lateral area residing in the root zone of an area to be irrigated and extending throughout the area, the mat forming a discontinuity with the material above the mat and the material below the mat; and distributing the irrigation water throughout the lateral area of the mat through the primary water distribution structure integrally located within the mat in response to the irrigation water supplied at the charge rate such that water is supplied evenly to the root zone.

14. The method of claim 13 wherein the step of distributing the irrigation water through the lateral area of the mat includes the step of:

a) distributing irrigation water through a network of interconnected channels associated with the primary water distribution structure.

15. The method of claim 14 wherein the primary water distribution structure includes a porous and laterally permeable primary water distribution material in areas between the interconnected channels and the step of distributing irrigation water throughout the lateral area of the mat includes:

a) distributing irrigation water from the channels through the primary water distribution material.

16. The method of claim 15 wherein the step of supplying irrigation water to the primary water distribution structure comprises:

a) directing irrigation water from a water supply conduit into one of the channels at a peripheral edge of the mat.

17. The method of claim 15 including the step of:

a) distributing the irrigation water from the primary water distribution material through an upper boundary material of the mat, the upper boundary material comprising a porous and permeable material having water charging characteristics different from the water charging characteristics of the primary water distribution material.

18. An irrigation apparatus adapted to be incorporated into the root zone of a soil area to be irrigated, the apparatus comprising:

a substantially continuous mat which may be positioned substantially parallel to the soil area to be irrigated;

a charge inlet associated with the mat; and a primary water distribution structure located within the mat for receiving the irrigation water through the charge inlet and, when the irrigation water is received at an operating flow rate, distributing the irrigation water substantially throughout the lateral area of the mat, wherein the primary water distribution structure comprises a porous and laterally permeable primary water distribution material and a network of laterally extending, interconnecting channels, the network of channels extending throughout the lateral area of the mat; the mat includes an upper boundary material selected from the group consisting of an open cell foam material, a reticulated material, and a perforated sheet material; and the mat includes a lower boundary material selected from the group consisting of an open cell foam material, a reticulated material, and a perforated sheet material.

19. The apparatus of claim 18 wherein the porous and laterally permeable primary water distribution material is selected from the group consisting of an open cell foam material, a reticulated material, and a granular material.

20. The apparatus of claim 18 further comprising:

a) a plurality of channel closure devices, each channel closure device substantially blocking a channel at a point at which the respective channel intersects a periphery of the mat.

21. The apparatus of claim 18 wherein the channels comprise open spaces having a transverse area greater than approximately 0.0625 square inch.

22. The apparatus of claim 18 wherein the charge inlet is located at the point at which one of the channels intersects a peripheral edge of the mat.

23. An irrigation apparatus adapted to be incorporated into the root zone of a soil area to be irrigated, the apparatus comprising:

a substantially continuous water-permeable mat for encompassing a soil area to be irrigated and which may be positioned substantially parallel to the soil area to be irrigated;

a charge inlet associated with the mat for supplying water which is distributed continuously throughout the area of the mat; and a primary water distribution structure integrally located within the mat for receiving the irrigation water through the charge inlet and, when the irrigation water is received at an operating flow rate, distributing the irrigation water substantially throughout the lateral area of the mat.

24. The apparatus of claim 23 wherein the primary distribution structure includes:
   a) a layer of porous and laterally permeable primary water distribution material.

25. The apparatus of claim 24 wherein the mat includes:
   a) a peripheral boundary material located around substantially the entire periphery of the mat, the peripheral boundary material having water charging characteristics different from the primary water distribution material.

26. The apparatus of claim 25 wherein the peripheral boundary material comprises a material which is less permeable than the primary water distribution material.

27. The apparatus of claim 25 wherein the charge inlet comprises an inlet through the peripheral boundary material.

28. The apparatus of claim 24 wherein the mat includes:
   a) an upper boundary material having water charging characteristics different from the primary water distribution material.

29. An irrigation apparatus adapted to be incorporated into the root zone of a soil area to be irrigated, the apparatus comprising:
   a substantially continuous water-permeable mat for encompassing a soil area to be irrigated and which may be positioned substantially parallel to the soil area to be irrigated;
   a charge inlet associated with the mat for supplying water which is distributed continuously throughout the area of the mat; and
   a primary water distribution structure located within the mat for receiving the irrigation water through the charge inlet and, when the irrigation water is received at an operating flow rate, distributing the irrigation water substantially throughout the lateral area of the mat, wherein the primary distribution structure includes a layer of porous and laterally permeable primary water distribution material and wherein the mat includes an upper boundary material having water charging characteristics different from the primary water distribution material, and wherein the charge inlet includes an opening through the upper boundary material.

30. The apparatus of claim 24 herein the charge inlet is positioned at a central location of the mat.

31. An irrigation apparatus adapted to be incorporated into the root zone of a soil area to be irrigated, the apparatus comprising:
   a substantially continuous water-permeable mat for encompassing a soil area to be irrigated and which may be positioned substantially parallel to the soil area to be irrigated;
   a charge inlet associated with the mat for supplying water which is distributed continuously throughout the area of the mat; and
   a primary water distribution structure located within the mat for receiving the irrigation water through the charge inlet and, when the irrigation water is received at an operating flow rate, distributing the irrigation water substantially throughout the lateral area of the mat, wherein the primary water distribution structure comprises
   a porous and laterally permeable primary water distribution material and
   a network of laterally extending, interconnecting channels, the network of channels extending through the lateral area of the mat.

32. The apparatus of claim 31 wherein the channels comprise open spaces having a transverse area greater than approximately 0.0625 square inch.

33. The apparatus of claim 31 wherein the channels comprise spaces of porous and permeable channel material having water charging characteristics different from the primary water distribution material.

34. The apparatus of claim 31 wherein the mat includes:
   a) an upper boundary material having water charging characteristics different from the primary water distribution material.

35. The apparatus of claim 31 wherein the mat includes:
   a) a lower boundary material having water charging characteristics different from the primary water distribution material.

36. The apparatus of claim 31 wherein the charge inlet is located at the point at which one of the channels intersects a peripheral edge of the mat.

37. An irrigation apparatus adapted to be incorporated into the root zone of a soil area to be irrigated, the apparatus comprising:
   a substantially continuous mat which may be positioned substantially parallel to the soil area to be irrigated;
   a charge inlet associated with the mat; and
   a primary water distribution structure including a layer of porous and laterally permeable primary water distribution material which comprises a substantially continuous and uniform layer of material selected from the group consisting of an open cell foam material, a reticulated material, and a granular material located within the mat for receiving the irrigation water through the charge inlet and, when the irrigation water is received at an operating flow rate, distributing the irrigation water substantially throughout the lateral area of the mat.

38. An irrigation apparatus adapted to be incorporated into the root zone of a soil area to be irrigated, the apparatus comprising:
   a substantially continuous mat which may be positioned substantially parallel to the soil area to be irrigated;
   a charge inlet associated with the mat; and
   a primary water distribution structure including a layer of porous and laterally permeable primary water distribution material and an upper boundary material having water charging characteristics different from the primary water distribution material, wherein the upper boundary material is selected from the group consisting of an open cell foam material, a reticulated material, and a perforated sheet material located within the mat for receiving the irrigation water through the charge inlet and, when the irrigation water is received at an operating flow rate, distributing the irrigation water substantially throughout the lateral area of the mat.

39. An irrigation apparatus adapted to be incorporated into the root zone of a soil area to be irrigated, the apparatus comprising:
- a substantially continuous mat which may be positioned substantially parallel to the soil area to be irrigated;
- a charge inlet associated with the mat; and
- a primary water distribution structure located within the mat for receiving the irrigation water through the charge inlet and, when the irrigation water is received at an operating flow rate, distributing the irrigation water substantially throughout the lateral area of the mat, wherein the primary water distribution structure includes:
  - a porous and laterally permeable primary water distribution material wherein the porous and laterally permeable material is selected from the group consisting of an open cell foam material, a reticulated material, and a granular material; and
  - a network of laterally extending, interconnecting channels, the network of channels extending through the lateral area of the mat.

40. An irrigation apparatus adapted to be incorporated into the root zone of a soil area to be irrigated, the apparatus comprising:
- a substantially continuous mat which may be positioned substantially parallel to the soil area to be irrigated, wherein the mat includes an upper boundary material having water charging characteristics different from the primary water distribution material and wherein the upper boundary material is selected from the group consisting of an open cell foam material, a reticulated material, and a perforated sheet material;
- a charge inlet associated with the mat; and
- a primary water distribution structure located within the mat for receiving the irrigation water through the charge inlet and, when the irrigation water is received at an operating flow rate, distributing the irrigation water substantially throughout the lateral area of the mat, wherein the primary water distribution structure includes a porous and laterally permeable primary water distribution material; and a network of laterally extending, interconnecting channels, the network of channels extending through the lateral area of the mat.

41. An irrigation apparatus adapted to be incorporated into the root zone of a soil area to be irrigated, the apparatus comprising:
- a substantially continuous mat which may be positioned substantially parallel to the soil area to be irrigated, wherein the mat includes a lower boundary material having water charging characteristics different from the primary water distribution material, and wherein the lower boundary material is selected from the group consisting of an open cell foam material, a reticulated material, and a perforated sheet material;
- a charge inlet associated with the mat; and
- a primary water distribution structure located within the mat for receiving the irrigation water through the charge inlet and, when the irrigation water is received at an operating flow rate, distributing the irrigation water substantially throughout the lateral area of the mat, wherein the primary water distribution structure includes a porous and laterally permeable primary water distribution material; and a network of laterally extending, interconnecting channels, the network of channels extending through the lateral area of the mat.

42. An irrigation apparatus adapted to be incorporated into the root zone of a soil area to be irrigated, the apparatus comprising:
- a substantially continuous mat which may be positioned substantially parallel to the soil area to be irrigated;
- a charge inlet associated with the mat; and
- a primary water distribution structure located within the mat for receiving the irrigation water through the charge inlet and, when the irrigation water is received at an operating flow rate, distributing the irrigation water substantially throughout the lateral area of the mat, wherein the primary water distribution structure includes a porous and laterally permeable primary water distribution material; and a network of laterally extending, interconnecting channels, the network of channels extending through the lateral area of the mat, and a plurality of channel closure devices, each channel closure device substantially blocking a channel at a point at which the respective channel intersects a periphery of the mat.

* * * * *